United States Patent

Danielmeyer

[15] 3,676,799
[45] July 11, 1972

[54] FREQUENCY STABILIZED LASER

[72] Inventor: Hans Guenter Danielmeyer, Matawan, N.J.

[73] Assignee: Bell Telephone Laboratories, Incorporated, Murray Hill, N.J.

[22] Filed: Dec. 28, 1970

[21] Appl. No.: 101,798

[52] U.S. Cl. .................................. 331/94.5, 350/160 R
[51] Int. Cl. .................................................... H01s 3/00
[58] Field of Search ........................... 331/94.5; 350/160 R

[56] References Cited

UNITED STATES PATENTS

| | | | |
|---|---|---|---|
| 3,486,131 | 12/1969 | Smith | 331/94.5 |
| 3,537,027 | 10/1970 | Smith | 331/94.5 |
| 3,431,514 | 3/1969 | Oshman et al. | 331/94.5 |
| 3,586,997 | 6/1971 | Kinsel | 331/94.5 |
| 3,327,243 | 6/1967 | Stickley | 331/94.5 |
| 3,466,565 | 9/1969 | Rigrod | 331/94.5 |

Primary Examiner—Ronald L. Wibert
Assistant Examiner—Edward S. Bauer
Attorney—R. J. Guenther and Arthur J. Torsiglieri

[57] ABSTRACT

Single frequency laser oscillation is realized by including within the laser cavity a resonant etalon, tuned to the desired laser frequency. This has the effect of suppressing all other modes while permitting the laser to oscillate at the desired single frequency. In addition, the etalon tuning is frequency modulated about the desired frequency, producing an amplitude modulation of the laser signal. The amplitude modulation thus produced is sensed by a phase detector which generates an error signal whenever the laser frequency tends to deviate from the mean, etalon frequency. The error signal is used, in turn, to retune the laser cavity.

It is an advantage of the present arrangement that spurious frequency modulation of the laser frequency, introduced by the stabilization system, is substantially less than that produced by comparable prior art stabilization circuits. Furthermore, such modulation can be conveniently reduced, or eliminated, by the addition of a dummy etalon driven in antiphase to the active etalon.

4 Claims, 2 Drawing Figures

Patented July 11, 1972 3,676,799

INVENTOR
H. G. DANIELMEYER
BY
*Sydney Sherman*
ATTORNEY

3,676,799

FREQUENCY STABILIZED LASER

This invention relates to single frequency lasers and, in particular, to arrangements for stabilizing the frequency of such lasers.

BACKGROUND OF THE INVENTION

Because the resonant cavity of a typical laser is much larger than the wavelength of the signals supported therein, it is inherently a multimode device. As a consequence, a laser oscillator is capable of simultaneously oscillating at a plurality of frequencies whose nominal center-to-center spacings are given by $c/2L$, where $c$ is the velocity of light, and $L$ is the effective cavity length. Thus, the output spectrum from a laser oscillator typically consists of a plurality of spaced, discrete frequencies.

In addition, because the wavelengths of the oscillations are orders of magnitude smaller than the cavity dimensions, the frequencies at which the laser oscillates are extremely sensitive to changes in these dimensions. As a result, the slightest changes in the laser parameters due to mechanical vibrations or heating effects, produces substantial changes in the output frequencies.

The generation of many frequencies by a laser is undesirable in that the unwanted modes represent a loss to the system. In addition, in a laser adapted for communication purposes, the excitation of many different modes, and their critical dependence upon the cavity dimensions, has an adverse effect upon the stability of the laser, and upon the modulation and demodulation processes. All of these factors are important considerations in a communication system.

It is, accordingly, the broad object of the present invention to limit laser oscillations to a single frequency and to stabilize that frequency.

BRIEF SUMMARY OF THE INVENTION

Single frequency laser oscillation, in accordance with the present invention, is realized by including within the laser cavity a resonant etalon, tuned to the desired laser frequency. This has the effect of suppressing all other modes while permitting the laser to oscillate at the desired single frequency. In addition, the etalon tuning is frequency modulated about the desired frequency, producing an amplitude modulation of the laser signal. The amplitude modulation thus produced is sensed by a phase detector which generates an error signal whenever the laser frequency tends to deviate from the mean, etalon frequency. The error signal is used, in turn, to retune the laser cavity.

It is an advantage of the present invention that spurious frequency modulation of the laser frequency, introduced by the stabilization system, is substantially less than that produced by comparable prior art stabilization circuit. Furthermore, such modulation can be substantially eliminated by the addition to the system of a dummy "etalon" with comparable properties, except that it is antireflection coated and, hence, is transparent to all frequencies within the modulation band. As such, it has no effect upon the amplitude modulation. However, when driven in antiphase with the active etalon, the residual frequency modulation of the laser beam can be made arbitrarily small.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
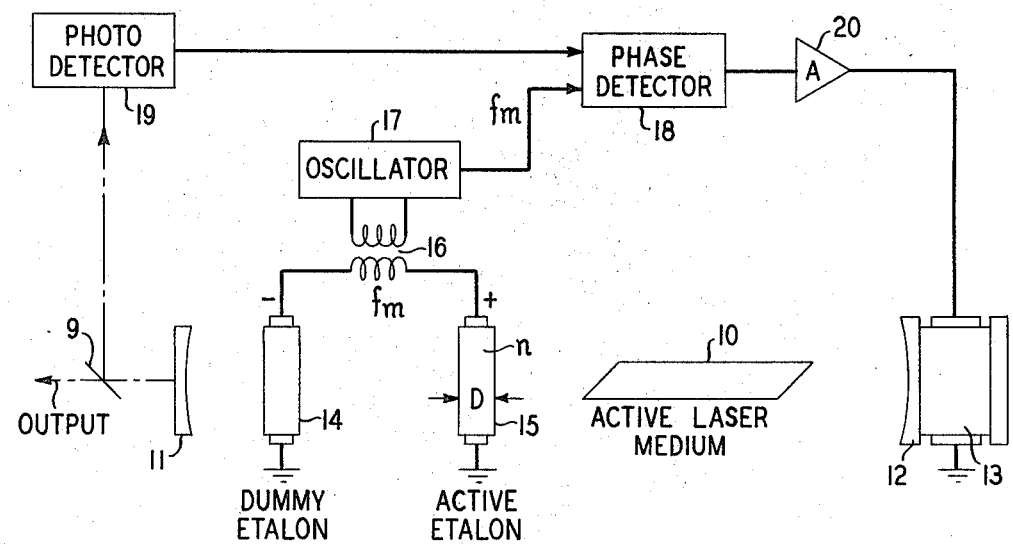
FIG. 1 shows a frequency stabilized laser in accordance with the present invention.

Referring to the drawings, FIG. 1 shows a single frequency laser oscillator, stabilized in accordance with the present invention. The laser per se comprises an active laser medium 10 disposed within a cavity defined by mirrors 11 and 12. Mirror 11, being partially transmissive, permits a portion of the intracavity energy to be coupled out of the cavity to form the laser output. Mirror 12 is mounted on a piezoelectric crystal 13 for reasons which will be explained more fully hereinbelow.

Also included within the laser cavity are the two etalons 14 and 15. The latter, which is the active etalon, is a high Q, resonant optical circuit, tuned to the frequency of interest. The former, referred to as the dummy etalon, and which is optionally included, is preferably made of the same material as the active etalon, but is coated with antireflecting surfaces. As such, it is uniformly transparent to all frequencies within the frequency band of interest.

The two etalons are made of a suitable electro- or magneto-optic material whose refractive index can be varied as a function of an applied electromagnetic field. For purposes of illustration, quartz or lithium niobate crystals can be used, and the etalon frequency modulated by the application of a transverse electric field. Since the two etalons are to be excited 180° out of phase, a transformer 16 is conveniently used for this purpose. As illustrated, one of the transformer windings is connected to an oscillator 17, while one end of the other transformer windings is connected to one side of etalon 14 and the other windings end is connected to one side of etalon 15. The opposite sides of the two etalons are connected to a common junction, such as ground.

A portion of the laser output signal is coupled to an amplitude detector 19 by means of a partially reflecting mirror 9. Alternatively, a signal component can be extracted through mirror 12, and mirror 9 omitted. In either arrangement, detector 19, which can be a simple photodiode or a photomultiplier device, detects amplitude variations in the laser signal produced by the variations in the resonant frequency of etalon 15, and couples the detected signal to a phase detector 18. Simultaneously, a reference signal from oscillator 17 is coupled to phase detector 18. The output from detector 18 is, in turn, amplified in amplifier 20, and the amplified signal impressed across piezoelectric crystal 13.

In operation, the laser oscillates at a frequency within the passband of active etalon 15. In addition, a signal from oscillator 17 frequency modulates the resonant frequency of etalon 15 at a rate $f_m$. This, in turn, amplitude modulates the laser signal. As will be explained in greater detail hereinbelow, the rate at which the laser amplitude varies depends upon the relative tuning of etalon 15 and the laser. If the laser is oscillating at the resonant frequency of the unmodulated etalon, variations in the etalon resonant frequency will produce amplitude variations in the laser signal at twice the modulating frequency. For this preferred condition, the signal coupled to the phase detector from amplitude detector 18 will be a second harmonic of the reference signal derived from oscillator 17, resulting in no output from the phase detector. If, however, the laser is improperly tuned, there will be a component of signal at the oscillator frequency in the amplitude detector output, resulting in the production of an error correcting signal by the phase detector. This signal is amplified and impressed upon piezoelectric crystal 13 which retunes the laser cavity by longitudinally displacing mirror 12 in such a direction as to decrease the amplitude of the error signal.

Figure 2:
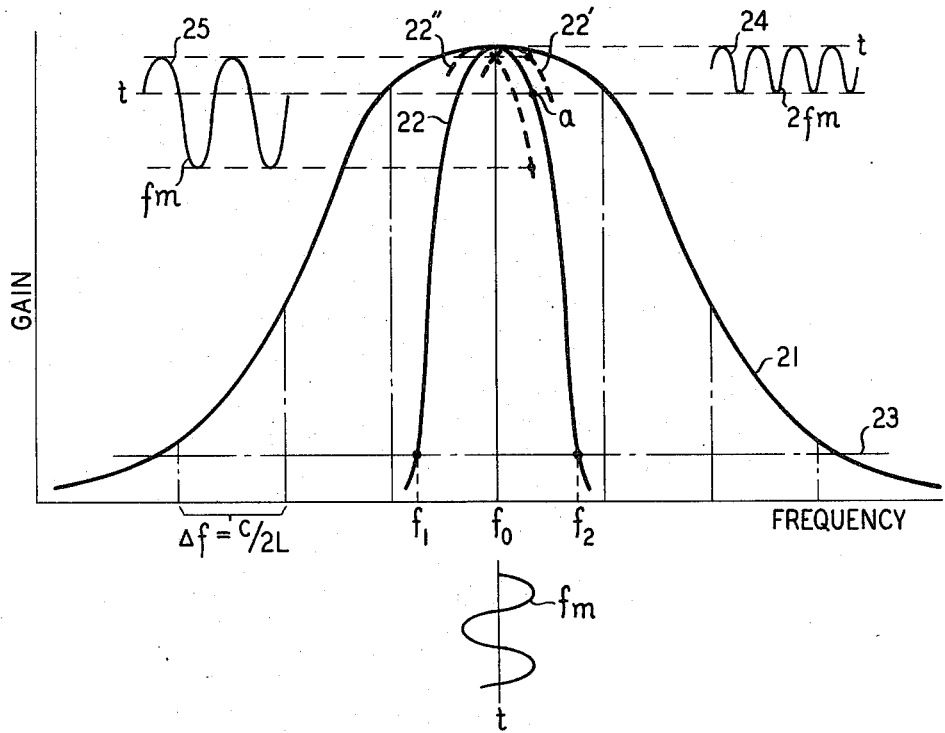
FIG. 2, included for purposes of explanation, shows the etalon band pass characteristic with respect to the laser gain-frequency curve.

FIG. 2 shows a characteristic laser gain-frequency curve 21 whose center frequency $f_0$ is determined by the composition of the active laser material. Also indicated is the threshold level 23 at which the gain per pass exceeds the losses due to useful loading, scattering, reflection, et cetera.

In general, the laser will oscillate at those particular frequencies included within the band defined by curve 21 for which the gain exceeds the threshold and for which the cavity length is an integral number of half-wavelengths. In particular, the longitudinal mode frequencies for the lowest order transverse modes defined by mirrors 11 and 12 are represented graphically in FIG. 2 by the vertical lines along the frequency axis. The nominal separation $\Delta f$ between modes is given by a $c/2L$, where $c$ is the velocity of light, and $L$ is the effective or optical length of the cavity.

In the absence of suitable means for suppressing the various modes, each of the permissible modes whose net gain exceeds the threshold level 23, will oscillate. In the instant invention, mode selection is made by the active etalon 15 which, as indicated hereinabove, is tuned to the frequency of interest. Assuming the latter to be $f_o$, curve 22 in FIG. 2 shows the bandpass characteristic of a resonant etalon tuned to have its maximum coefficient of transmission at $f_o$ and to have a sufficiently high Q to suppress the two, next adjacent modes at $f_o \pm \Delta f$. Thus, in operation the laser of FIG. 1 oscillates at only one frequency, $f_o$, because of the inclusion within the laser cavity of etalon 15. It is apparent, however, that there is a range of frequencies within the pass-band of etalon 15 for which the gain exceeds the threshold 23. Thus, the etalon, by itself, cannot prevent the laser frequency from drifting between the desired frequency $f_o$, and frequencies $f_1$ or $f_2$ which, as indicated in FIG. 2, are the minimum and maximum frequencies, respectively, between which the gain per pass exceeds threshold 23. It will be noted, however, that as the frequency changes, the laser output amplitude decreases significantly. Accordingly, small changes in laser frequency are indicated by large changes in laser amplitude and can be utilized as a control mechanism. In the prior art, this was done by deliberately modulating the laser cavity length and inducing, thereby, a change in the laser frequency. The disadvantage of this technique is that it results in an inherent modulation of the laser frequency, which is clearly inconsistent with the goal of frequency stabilization.

The present invention avoids this inconsistency by reversing the functions of the two cavities. Instead of varying the laser cavity and, thereby, modulating the laser frequency, a parameter of the etalon is changed, as a result of which the etalon frequency is modulated. This has the effect of alternately shifting the center frequency of the etalon band-pass curve 22 from $f_o$ to a higher frequency, as indicated by curve 22', and to a lower frequency as indicated by curve 22''. This also has the effect of modulating the amplitude of the laser beam but without directly modulating the laser frequency. Some frequency modulation is, nevertheless, incidentally produced, as is explained hereinbelow. However, as will also be explained, this incidental modulation can be totally eliminated, for all practical purposes, by means of dummy etalon 14.

Referring once again to FIG. 1, the resonant frequency of etalon 15 is frequency modulated about the desired frequency $f_o$ at a rate $f_m$ by means of a signal derived from oscillator 17. This, as illustrated graphically in FIG. 2, shifts the pass-band of the etalon back and forth about frequency $f_o$. If the laser is oscillating at frequency $f_o$, the amplitude of the laser output signal will decrease equally as the etalon is tuned to either side of $f_o$, producing an amplitude variation at twice the modulating rate. This is illustrated by curve 24 in FIG. 2. In operation, a portion of the laser output is directed, by means of partially transmissive mirror 9, to photodetector 19 which detects this amplitude modulation and coupled the detected signal to phase detector 18. Simultaneously, a component of the modulating signal derived from oscillator 17 is also coupled to the phase detector. As is known, the output from a phase detector is zero when simultaneously energized by a signal and a second harmonic of that signal. Thus, no correction signal is coupled to piezoelectric crystal 13 when the laser is oscillating at the desired frequency $f_o$. If, however, the laser frequency drifts, for one reason or other, away from $f_o$ to a higher frequency, as indicated by point $a$ on curve 22, the amplitude of the laser output will increase as the etalon is tuned to a higher frequency, but will decrease as the etalon is tuned to a lower frequency. This will produce a variation in the amplitude of the laser output signal at the same rate as the modulating signal, as indicated by curve 25. Accordingly, a component at the modulating frequency $f_m$ will be detected and coupled to the phase detector. In this case, a correction signal is generated which, when coupled to piezoelectric crystal 13, changes the length of laser cavity and, thereby, retunes the laser to frequency $f_o$. Similarly, if the laser frequency drifts to a lower frequency, a correction signal of opposite polarity is produced which raises the laser frequency to frequency $f_o$.

The operation of the stabilization system just described does not involve any inherent modulation of the laser frequency. However, because of its presence within the laser cavity, tuning of the etalon does produce an incidental modulation of the laser frequency. As indicated hereinabove, the frequencies of the modes supported by the laser cavity are determined by the optical length $L$ of the cavity, where $L$ is a function of the physical distance between the cavity mirrors and the refractive index over this distance. Thus, changing the refractive index $n$ of the etalon material and/or its thickness $D$ in order to tune the etalon, also changes the optical length of the cavity and, thus, modulates the laser frequency. Quantitatively, the change in the etalon frequency $df$ is given by $$df = -\left(\frac{dD}{D} + \frac{dn}{n}\right) f_0 \qquad (1)$$

where $D$ and $n$ are the thickness and refractive index, respectively, of the etalon for zero field; and $dD$ and $dn$ are the changes in the thickness and the refractive index produced by the electromagnetic field applied to the etalon.

Since the etalon is also part of the laser cavity, changes in the former also produce a change in the frequency of the latter. This change, $dF$, is given by $$dF = -\left[\frac{dD}{D} + \frac{dn}{n} - \frac{dD}{nD}\right] \left[\frac{nD}{L}\right] f_0. \qquad (2)$$

Substituting from equation (1), we obtain $$dF = -df \frac{nD}{L} + \frac{dD}{L} f_0. \qquad (3)$$

Since both $nD$, which is the optical length of the etalon, and $dD$, are obviously much smaller than the optical length of the laser cavity, the change in the laser frequency as given by equation (3), is much less than the change in the etalon frequency. Indeed, by the appropriate selection of $n$ and $D$, $dF$ can be reduced to zero. More typically, however, $dF$ can easily be made two or more orders of magnitude less than $df$. Even this small frequency modulation, however, can be further reduced by the inclusion within the cavity of dummy etalon 14. Unlike the active etalon, the dummy etalon has no selectivity over the frequency band of interest and, hence, has no effect upon the amplitude modulation. However, by being driven 180° out of phase with the active etalon, the differential change in the thickness and the differential change in the refractive index of the dummy etalon are such as to neutralize the corresponding changes in the active element. As a consequence, the overall optical length, $L$, of the cavity remains substantially constant, and $dF$ approaches zero.

If the etalons are not exactly identical, the electromagnetic fields applied thereto can be proportioned such that the net frequency modulation in the laser output is reduced below any specified detectable limit.

Typical frequency modulation required for the prior art, cavity-length modulation technique is about 8 MHz, or $3 \cdot 10^{-8}$ of the frequency of an Nd:YAG laser. With the etalon thicknesses equal to within 1 percent, in accordance with the present invention, the laser frequency modulation is reduced to about 800 Hz, without any adjustments, to produce the same level of amplitude modulation. This corresponds to $3 \cdot 10^{-12}$ of the laser frequency. Using quartz etalons, biasing fields of the order of several hundred volts per centimeter are typical.

The amount of frequency modulation required to produce a given change in the amplitude of the laser signal can be further reduced in solid state lasers by modulating the etalon at the laser relaxation oscillation frequency. The latter is the frequency of maximum sensitivity of solid state lasers to loss modulation. Consequently, an amplification factor of the order of 100 can be realized at no additional cost. The required frequency modulation can then be reduced by at least one order of magnitude.

It is, accordingly, understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

I claim

1. A single frequency laser comprising:
   an active laser medium disposed within a resonant cavity supportive of oscillations at a plurality of different frequencies;
   a resonant etalon, tuned to one of said frequencies, located within said cavity for suppressing oscillations at all frequencies other than said one frequency;
   a signal source, coupled to said etalon, for amplitude modulating said oscillations by varying the resonant frequency of said etalon over a band of frequencies about said one frequency;
   error detecting means coupled to the output of said laser for generating an error correcting signal whenever said laser frequency differs from said one frequency;
   and means responsive to said error correcting signal for adjusting the optical length of said cavity so that it remains resonant at said one frequency.

2. The laser according to claim 1 wherein said error detecting means comprises:
   an amplitude detector for detecting the amplitude modulation produced by varying the resonant frequency of said etalon;
   and means for coupling said amplitude detector to a phase detector and means for coupling a reference signal from said signal source to said phase detector, wherein said error correcting signal is generated.

3. The laser according to claim 1 wherein;
   said cavity comprises a pair of spaced mirrors;
   one of said mirrors is mounted on a piezoelectric crystal;
   and wherein said error correcting signal is impressed upon said crystal.

4. The laser according to claim 1 including, in addition;
   a second etalon disposed within said resonant cavity;
   said etalon having a band-pass characteristic that is uniform over said band of frequencies;
   and means for coupling said signal source to said second etalon in antiphase to said resonant etalon.

* * * * *